United States Patent
Shahlari et al.

(10) Patent No.: US 11,939,423 B2
(45) Date of Patent: Mar. 26, 2024

(54) BIODEGRADABLE VCI PACKAGING COMPOSITIONS

(71) Applicant: Northern Technologies International Corporation, Circle Pines, MN (US)

(72) Inventors: Mahin Shahlari, North Oaks, MN (US); Ik-Hau Ng, Circle Pines, MN (US)

(73) Assignee: Northern Technologies International Corporation, Circle Pines, MN (US)

( * ) Notice: Subject to any disclaimer, the term of this patent is extended or adjusted under 35 U.S.C. 154(b) by 680 days.

(21) Appl. No.: 17/254,680

(22) PCT Filed: Jun. 30, 2020

(86) PCT No.: PCT/US2020/040277
§ 371 (c)(1),
(2) Date: Dec. 21, 2020

(87) PCT Pub. No.: WO2021/003146
PCT Pub. Date: Jan. 7, 2021

(65) Prior Publication Data
US 2022/0185953 A1    Jun. 16, 2022

Related U.S. Application Data

(60) Provisional application No. 62/870,208, filed on Jul. 3, 2019.

(51) Int. Cl.
*C08G 63/183* (2006.01)
*C08L 67/02* (2006.01)
*C23F 11/02* (2006.01)

(52) U.S. Cl.
CPC ............ *C08G 63/183* (2013.01); *C08L 67/02* (2013.01); *C23F 11/02* (2013.01); *C08L 2201/06* (2013.01); *C08L 2201/08* (2013.01)

(58) Field of Classification Search
CPC ... C08G 63/183; C08L 67/02; C08L 2201/06; C08L 2201/08; C08L 67/04; C23F 11/02; B32B 27/20; B32B 2307/7246; B32B 27/08; B32B 2264/102; B32B 2264/104; B32B 2307/7163; B32B 2307/752; B32B 27/36; B32B 2439/46; C08K 5/09; C08K 5/098; C08K 3/34; C08K 5/0008; C08K 3/28; C08K 3/013; C08K 3/01; C08K 2201/014; C08K 5/3475
See application file for complete search history.

(56) References Cited

U.S. PATENT DOCUMENTS

| | | |
|---|---|---|
| 4,973,448 A | 11/1990 | Carlson et al. |
| 5,139,700 A | 8/1992 | Miksic et al. |
| 5,715,945 A | 2/1998 | Chandler |
| 6,028,160 A | 2/2000 | Chandler et al. |
| 6,156,929 A | 12/2000 | Chandler et al. |
| 6,617,415 B1 | 9/2003 | Miksic et al. |
| 6,787,065 B1 | 9/2004 | Schapira et al. |
| 6,984,426 B2 | 1/2006 | Miksic et al. |
| 8,008,373 B2 | 8/2011 | Narayan et al. |
| 2004/0173779 A1* | 9/2004 | Gencer .............. C08K 3/22 252/387 |
| 2007/0145334 A1 | 6/2007 | Numbu et al. |
| 2008/0064812 A1 | 3/2008 | Narayan et al. |
| 2013/0231420 A1 | 9/2013 | Alidedeoglu et al. |
| 2014/0235777 A1 | 8/2014 | Noordegraaf et al. |
| 2016/0230333 A1 | 8/2016 | Hickie |

FOREIGN PATENT DOCUMENTS

| | | | |
|---|---|---|---|
| KR | 2007117170 A | * | 12/2007 |
| KR | 100934197 B1 | | 12/2009 |
| WO | 2020/032931 A1 | | 2/2020 |

OTHER PUBLICATIONS

Weng et al., "Biodegradation behavior of poly(butylene adipate-co-terephthalate) (PBAT), poly(lactic acid), and their blend under soil conditions," Polymer Testing 32 (2013) 918-926. (Year: 2013).*
Extended European Search Report for EP Application No. 20834605.6 dated Jul. 10, 2023, 9 pages.

* cited by examiner

Primary Examiner — K. Boyle
(74) Attorney, Agent, or Firm — Fox Rothschild LLP

(57) ABSTRACT

A breathable biodegradable volatile corrosion inhibitor polyester composition comprises one or more biodegradable homopolymer polyesters and/or one or more biodegradable random copolymer polyesters, one or more volatile corrosion inhibitors (VCI), and one or more fillers wherein said composition has a higher water-vapor transmission rate than polyethylene.

19 Claims, No Drawings

BIODEGRADABLE VCI PACKAGING COMPOSITIONS

The present application is a National Stage Application under 35 U.S.C. § 371 of International Application No. PCT/US2020/040277 filed Jun. 30, 2020, which claims the benefit of priority to U.S. patent application Ser. No. 62/870,208 filed Jul. 3, 2019, the disclosures of which are hereby incorporated by reference in their entireties.

FIELD

A breathable biodegradable volatile corrosion inhibitor composition comprises a biodegradable polyester composition that comprises one or more homopolymer polyesters and/or one or more random copolymer polyesters with one or more volatile corrosion inhibitors (VCI), and at least one or more fillers that unexpectedly improve various physical properties of the composition. The total amount of said one or more VCI is generally from about 0.1 wt. % to about 10 wt. % based upon the total weight of all of the biodegradable polyesters excluding said fillers.

BACKGROUND

An urgent need for biodegradable compositions in this world exists due to the ever increasing amount of waste plastics and polymers that are deposited in land dumps, garbage pits, and municipal and governmental dumps that often pollute and/or admit dangerous and/or toxic compounds into the water table. In oceans and seas a growing amount of waste is proving to be a danger to fish and mammals that consume the same and often die therefrom whereby an important source of food is eliminated. Packaging is an integral part of corrosion protection as environmental elements cause corrosion when in contact with metallic parts, but after the shipment arrives, the packaging which is mostly made out of LDPE and LLDPE thin films, needs to be disposed of, and many recycling facilities do not accept flexible packaging made of LDPE and LLDPE. Therefore, the packaging material end up in landfills, etc. In view of present consumer awareness, there is ever increasing pressure on corporations to reduce their plastic foot-print and one of the ways to so do is to use biodegradable bags for packaging of metals where the shelf life of the product and the other factors allows biodegradable material to be used.

U.S. Pat. No. 6,028,160 to Cortec Corporation relates to biodegradable resin products consisting essentially of a polymeric resin of polyethylene, starch, polyesters such as polylactic acid, or other suitable polyesters. In admixture with the resin is a particulate vapor phase corrosion inhibitor selected from amine salts, ammonium benzoate, triazole derivatives, tall oil imidazolines, alkali metal molybdates, alkali dibasic acid salts, and mixtures thereof, and is present in an amount ranging from between 1% and 3% by weight of the polymeric resin.

U.S. Pat. No. 6,156,929 to Cortec Corporation relates to biodegradable resin products consisting essentially of a polymeric resin of starch, polyesters of polylactic acid and polycaprolactone. In admixture with the resin is a particulate vapor phase corrosion inhibitor selected from amine salts, ammonium benzoate, triazole derivatives, tall oil imidazolines, alkali metal molybdates, alkali dibasic acid salts, and mixtures thereof, and is present in an amount ranging from between 1% and 3% by weight of the polymeric resin.

U.S. Pat. No. 6,617,415 to Cortec Corporation relates to biodegradable resin products consisting essentially of a polymeric resin of starch, polyesters such as polylactic acid, or other suitable polyesters. In admixture with the resin is a particulate vapor phase corrosion inhibitor selected from amine salts, triazole derivatives, alkali dibasic acid salts, and mixtures thereof, and is present in an amount ranging from between 1% and 3% by weight of the polymeric resin and which is shaped into formed articles.

U.S. Pat. No. 6,984,426 to Cortec Corporation relates to a biodegradable film formable into biodegradable bags which includes the blended product of polylactic acid and a suitable biodegradable polymeric resin. The blended product includes from about 5% to about 50% by weight polylactic acid.

U.S. Publication 2014/0235777 to Purac Biochem B.V. relates to a composition comprising a poly-D-lactic acid (PDLA) polymer and a poly-L-lactic acid (PLLA) polymer. It also relates to a method for the production of a moulded part comprising the steps of heating a mold, and supplying to the mold a composition comprising a poly-D-lactic acid (PDLA) polymer and a poly-L-lactic acid (PLLA) polymer. It further relates to a composition comprising a poly-D-lactic acid (PDLA) polymer and a poly-L-lactic acid (PLLA) polymer for use in injection molding, thermoforming and/or film blowing. It also relates to a composition that can be obtained by heating a composition comprising a poly-D-lactic acid (PDLA) polymer and a poly-L-lactic acid (PLLA) polymer.

U.S. Pat. No. 8,008,373 to Northern Technologies International Corporation relates to a biodegradable thermoplastic polymer masterbatch composition comprising a blend of at least one biodegradable thermoplastic polymer containing high loading of a particulate filler uniformly dispersed therein. The amount of the biodegradable thermoplastic polymer is generally from about 25% to about 50% by weight and the amount of the filler is from about 75% to about 50% by weight, based upon the total amount of one biodegradable polymer and the at least one filler. The uniform dispersion of the fillers is obtained by adding small particles of the filler to a melt of the biodegradable polymer and blending using high shear equipment with special screw geometry. The masterbatch composition is then physically blended with additional biodegradable thermoplastic polymer and extrusion processed into final articles such as blown and cast films, molded products, and the like. The masterbatch multi-stage approach results in a product that has improved physical properties and lower costs over that of a one-step blend of the same amount of a biodegradable thermoplastic polymer and a filler that is subsequently heat formed into a final product

SUMMARY

An aspect of the present invention is to alleviate the above-noted pollution and/or toxic problems. Another aspect is providing a composition that is in the form of a film that can pass EN 13432 and ASTM D6400 which evaluates timely composability of the material in industrial composting facilities. The composition has superior mechanical properties and volatile corrosion inhibition properties compared to PE, unlike the above mention products, so it can truly replace PE based material in the field of corrosion mitigation. Another important aspect of the present invention is to provide a biodegradable VCI packaging composition that effectively prevents corrosion of various items including machines, tools, and metal parts. As one of the essential components for corrosion is water, it is commonly believed that lower water-vapor transmission rates (WVTR)

of a VCI packaging composition such as packaging material containing a VCI result in better corrosion inhibition. However, our results show that biodegradable compositions such as in the form of biodegradable polyester plastic bags perform better than polyethylene (PE) bags when containing the same amounts of VCIs therein, despite higher WVTR of the biodegradable bags than PE bags. VCI chemistries like sodium nitrite, salts of carboxylic acids, or ammonium salts react with water to release the VCI and therefore, if more moisture is permeated through the bag faster, more VCI chemistry is activated in a shorter period and the chemistry would reach the surface of metal sooner than in a bag with a lower water vapor transmission rate.

The VCI packaging compositions of the present invention containing fillers have improved breathability, showed increased water vapor transmission rates (WVTR), improved process-ability in extrusion equipment, less blocking which allows the bags made with this material to be opened more easily, lower cost without sacrificing the mechanical properties of the product, and better corrosion resistance than compositions containing the same amounts and types of VCIs therein but no fillers.

These and other aspects of the present invention are achieved by utilizing a blend of PLA and/or an aromatic aliphatic polyester copolymer with one or more VCI compounds and one or more fillers.

A biodegradable volatile corrosion inhibitor polyester composition, comprises one or more biodegradable random copolymer polyesters and/or one or more biodegradable homopolymer polyesters; from about 0.1 wt. % to about 10 wt. % of one or more volatile corrosion inhibitors based upon 100 total parts by weight of said one or more biodegradable random copolymer polyesters and/or said one or more biodegradable homopolymer polyesters; and from about 3 to about 53 parts by weight of at least one filler based upon 100 parts by weight of said one or more biodegradable random copolymer polyesters and/or said one or more biodegradable homopolymer polyesters.

DETAILED DESCRIPTION

The present invention relates to biodegradable VCI compositions that are desirable for many uses including packaging of various items, apparatus, machines, parts, and the like. Such items are contained within, encased, wrapped, or otherwise exist within the biodegradable VCI packaging compositions of the present invention. The packaging material preferably is in the form of a sheet or film that can be used to form a container, enclosure, or box for the above-noted items to be protected against corrosion.

An essential component of the biodegradable VCI composition is one or more biodegradable homopolymer polyesters or one or more random copolymer polyesters, or both. Polymers that can be used as one or more homopolymer polyesters such as a polylactide, polycaprolactone, a blend of PLA and polycaprolactone, a polyglycolide, or polyhydroxyalkanoates (PHA), or any combination thereof, that desirably is relatively pure, that is contains no contaminates or polymers therein. That is, it generally contains less than about 3 or about 1 wt. % of any contaminate, desirably less than about 0.5 wt. %, and preferably less than about 0.1 wt. % or nil, has no contaminates whatsoever that exist.

Typical molecular weights of commercial polylactide homopolymers or other homopolymer polyesters can be utilized wherein the weight average molecular weight thereof is from about 100,000 to about 175,000, desirably from about 110,000 to about 150,000, and preferably from about 125,000 to about 140,000 g/mol. One or more polylactides can be utilized that differ in molecular weight, and/or are obtained from a different manufacturer. As by way of example only, a suitable polylactide that can be used in the present invention is PLA 3052D, made by Natureworks.

In addition to the one or more biodegradable homopolymer polyesters, or in lieu thereof, one or more random copolymer polyesters such as an aliphatic-aromatic random copolyester or a random aliphatic copolyester can be utilized. The number and type of random copolyesters are large and generally have the formula:

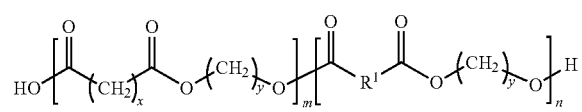

where $R^1$, independently comprises=

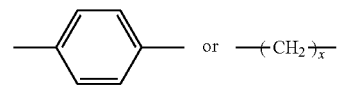

wherein, x, independently, is an integer from about 2 to about 10, or about 34 (dimer fatty acid), wherein, y, independently, is an integer of from 2 to about 8.

Desirably, $-(CH_2)_x-$ can be derived from an adipic acid, sebacic acid, or azelaic acid, and $-(CH_2)_y-$ can be derived from 1,4-butanediol or ethylene glycol.

The number of "m" and "n" repeat units is such that the total weight average molecular weight of the random copolymer is as set forth below.

Examples of suitable compostable random copolymer polyesters include polybutylene sebacate-co-terephthalate (PBST), with polybutylene adipate-co-terephthalate (PBAT) being preferred. The weight average molecular weight of the one or more random copolymer polyesters, independently, can range from about 80,000 to about 175,000 with a desirable weight average molecular weight being from about 90,000 to about 150,000, and preferably from about 100,000 to about 130,000.

The weight average molecular weight of the above-noted polylactide homopolymer polyesters as well as the random copolymer polyesters was determined by gel permeation chromatography (GPC) wherein the polymer was dissolved in chloroform, the solvent for GPC was tetrahydrofuran and the temperature was 23° C.

It is an important aspect of the present invention that random copolyesters, not contain any repeat units derived from succinic acid. Such compositions have generally been found to have poor physical properties such as low tear resistance as well as low transparency, both of which are important properties for corrosion inhibiting compositions. Also, generally aliphatic-copolyesters such as PBS (poly) (butylene succinate) have poor mechanical properties and are/or also expensive. Hence, if utilized, the amount of any repeat units derived from succinic acid is very small such as less than about 10%, and desirably less than 2% based upon the total number of repeat groups in the copolymer. Preferably nil, that is no copolyesters derived from a succinic acid are utilized whatsoever based upon the total weight of the one or more biodegradable polyesters of the present invention.

When a mixture of the one or more random copolymer polyesters is utilized with one or more of the homopolymer polyesters, the amount thereof (i.e. copolymer(s)) is from about 50 wt. % to about 95 wt. %, desirably from about 60 wt. % to about 90 wt. %, and preferably from about 70 wt. % to about 85 wt. % based upon 100 total parts by weight of all of the biodegradable polyesters. The amount of one or more homopolymer-polyester is from about 5 wt. % to about 50 wt. %; desirably from about 10 wt. % to about 40 wt. %, and preferably from about 15 wt. % to about 30 wt. % based on 100 total parts by weight of all of the biodegradable polyesters. If the polyester inhibitor composition is not a blend, the amount of the homopolymer or the random copolymer is of course, 100 wt. %.

As an example, it has been found that high ratios of the one or more random copolyesters to the amount of the one or more homopolyesters such as PLA is important with regard to increasing the mechanical performance of the product and shelf life.

According to the present invention, biodegradable VCI packaging compositions can be made from one or more homopolymers as noted above, or from one or more copolymers as noted above, or from a blend containing one or more homopolymers with one or more copolymers. Moreover, one or more fillers are generally always utilized with any of the three above-noted blends since they unexpectedly have been found to improve properties thereof as set forth hereinbelow.

One or more volatile corrosion inhibitors of the present invention that can be utilized comprise various triazoles and derivatives thereof such as benzotriazole and tolytriazole; various benzoates such as ammonium benzoate; various ammonium salts; various carbamates; various phosphates; and various alkali acid salts such as set forth in U.S. Pat. Nos. 4,973,448; 5,139,700; 5,715,945; 6,028,160; 6,156,929; 6,617,415; and 6,787,065, hereby fully incorporated by reference. Useful VCIs of the present invention preferably include various inorganic nitrites or alkali metal nitrites with potassium nitrite and sodium nitrite being preferred, as well as various sodium salts such as sodium octanoate, sodium benzoate, various benzoic acid derivatives such as 2 or 3 or 4-hydroxy-benzoic acid, ammonium benzoate and various alkali metal salts (e.g. sodium or potassium) of aliphatic carboxylic acids such as sorbic acid or a dicarboxylic acid. Such acids have from about 5 to about 18 carbon atoms.

Fillers are an important aspect of the present invention to provide ease of processing, e.g. extruding the resin and anti-blocking effect for the bags made with such material, cost reduction, retention of tensile strength, reduced density of the end product, and higher stiffness. It has also been found that various one or more fillers such as talc, calcium carbonate, sodium carbonate, silicates, clay, and barites, or any combination thereof, help adjust the WVTR rates. That is, mixing the same into the overall biodegradable VCI packaging compositions improved the porosity and thus promote a desired access of more water molecules to various one or more VCI compounds. It has also been found that the higher water vapor transmission rate (WVTR) of biodegradable polyester films than that of polyethylene (PE) based films allows for lower loadings of VCI compounds for short-term applications of the biodegradable VCI packaging compositions of the present invention. Talc is a preferred filler. The total amount of the one or more fillers is generally from about 3 to about 53 parts by weight, desirably from about 5 to about 33 parts by weight, and preferably from about 5 to about 18 parts by weight based upon 100 total parts by weight of the one or more homopolymer polyesters and/or one or more random copolymer polyesters. Depending on the aspect ratio of the fillers added, they can reduce or increase the breathability than hence help with tailoring desired shelf life and usage life for different applications based on the type of filler used. The present invention is free of starch as a filler, that is, it has no starch.

A unique advantage of the present invention due to the various factors that contribute to a high WVTR of the present invention is that only low amounts of such VCI compounds need be utilized. That is, the various one or more VCI's compounds range from about 0.1 wt. % to about 10 wt. %, desirably from about 0.3 wt. % to about 5 wt. %, and preferably from about 0.5 wt. % to about 2 or about 0.9 wt. % based on the total weight, e.g. 100 total parts by weight, of the one or more homopolymer polyesters and/or the one or more random copolymer polyesters. In other words, the total amount of one or more VCI's utilized in the present invention can vary widely.

The preparation of the various different formulations of the biodegradable VCI packaging composition of the present invention can generally be carried out in any manner known to the art and to the literature. With respect to the present invention, various pre-masterbatches are initially prepared and then subsequently all are mixed together at a temperature above the melting point biodegradable compounds such as the various types of polyesters disclosed herein above. For example, from about 1 to about 10 parts by weight of one or more VCI's are added to about 20 parts by weight of one or more random polyesters and/or one or more of the homopolymer polyester polymers of the present invention to form a VCI masterbatch. Since the final total amount of VCI in the final composition is less than 10 wt. %, based upon the total weight of the one or more homopolymer polyesters and/or the one or more copolymer polyesters, the amount of VCI masterbatch is subsequently added to an existing fair amount of biodegradable polyesters to yield a biodegradable polyester composition having, as noted above, that is from about 0.1 wt. % to about 10 wt. %, desirably from about 0.3 wt. % to about 5 wt. %, and preferably from about 0.5 wt. % to about 2 wt. % of a VCI therein based on the total weight of only said polyesters. The preparation of the VCI masterbatch can generally be carried out in any heating and mixing device, such as an extruder, an internal mixer, or preferably a twin-screw extruder, wherein the mixing temperatures are above the melting point of the random copolyesters.

A filler masterbatch is generally made in the same manner wherein small amounts by weight of the filler are added to a large amount of the one or more random copolyesters, and/or one or more homopolymer polyester polymers. Subsequently, a small amount of the filler masterbatch is added to a larger amount of the biodegradable polyesters to form an end composition having the desired amount of filler therein. Of course, the blending temperature of the one or more fillers to form the filler masterbatch is a temperature above the melting point of the one or more random copolyesters.

In other words, to prepare the formulations of the present invention, a composition is made containing 100 parts by weight of the one or more homopolymer polyesters and/or one or more random copolymer polyesters. To this is added an appropriate amount of the VCI so that based upon a final total amount of 100 parts by weight of the desired biodegradable polyesters, the amount of VCI is, as noted above, from about 0.1 wt. % to about 10 wt. % thereof. Then the filler masterbatch added in appropriate amounts so that the total final amount of the one or more biodegradable polyesters is 100 parts by weight and the amount of the one or more fillers is within the above-noted weight ranges. That is, once the various desired masterbatches have been made with respect to the one or more VCI compounds, the one or more filler compounds, all of the necessary masterbatches are mixed together with additional amounts of biodegradable random copolyesters and/or a desired amount of a one or more biodegradable homopolyesters to form the final biodegradable VCI packaging composition. The mixing can be carried out in any desired mixing device such as calender, an extruder, and so forth and shaped either into pellets, granulars, and the like, or directly formed into the end product such as a sheet, bag or wrapper having a desired thickness. With regard to the present invention, sheets having a thickness of from about 0.5 to about 8 mils, and desirably from about 0.8 to about 5.0 mils, and preferably about 1.5 to about 2.5 mil thickness that subsequently can be utilized to form a container, an enclosure, or the like to protect generally a metal article or item from corrosion. Moreover, the packaging composition of the present invention can be one or more laminates having one or more sheets therein. For example, a first sheet can comprise the one or more homopolymer polyester polymers and the above noted one or more random copolymer polyesters that contain a VCI therein and one of the above noted fillers therein. A second sheet of the laminate can comprise only said one or more biodegradable random copolymer polyesters optionally comprising a filler and optionally comprising a VCI. It should be obvious that many other different types of laminates can be made from the biodegradable volatile corrosion inhibitor polyester compositions of the present invention.

According to the present invention, breathable biodegradable volatile corrosion inhibitor packaging compositions can be prepared having a broad range of WVTR such as from about 100 to about 2000, desirably from about 300 to about 1000, and preferably from about 400 to about 600[g/(m2 d)] at 38° C./90% RH, normalized to 1 mil according to ASTM F1249.

The present invention will be better understood by reference to the following examples which serve to illustrate the present invention, but not to limit the same. The following standard tests realized for determining properties of the prior art as well as the present invention.

EXAMPLE 1: PBAT pellets were dried at 50° C., for minimum of 2 hours and mixed with grinded sodium nitrite powder (VCI#1) at 70 to 30 ratio. The mixture was then fed to the feed port of a twin-screw counter-rotating LabTech® extruder having L/D of 44 and screw diameter of 26 mm, in which most of the zones were controlled at temperatures in the range from about 270° F. to 290° F. The die temperature was maintained at 300° F. The motor speed was about 150 rpm and generates a "strand" which was cooled in a water bath, pelletized into pellets about 3.18 mm (0.125 in) and dried.

The VCI MB was then mixed with similarly dried PBAT and PBAT/filler pellets and/or PLA at stated in Table 1 and extruded into a film via blown film line, run at 5 ft/min at 60 micron thickness.

A control sample was made with a blend of LDPE and LLDPE with comparable level of VCI in it for comparison.

In Contact corrosion testing the panel inside the PE based resin, which have lower WVTR showed several corrosion areas along the edges and more than three spots on the panels' body when tested according to IEC 68-2-30 Cyclic Chamber Testing. The panels in PE bags which would be the control received grade 3, while the panels in this example with biodegradable resins, PBAT/filler, and PBAT/PLA/filler blend, showed no corrosion and were graded at 5, after 7 cycles.

The WVTR of the LDPE/LLDPE (Control) sample was below 11 [g/(m2·d)] versus above 300 [g/(m2·d)] at 38° C./90% RH for said above Example 1.

The VCI testing according to NACE Standard TM0208, showed grade 3 for the biodegradable sample for the present invention and grade 2 for the PE based control sample with comparable VCI content.

| Example | PBAT | PLA | Filler | VCI 1 |
|---------|------|-----|--------|-------|
| 1 | 100 | 0 | 8.18777 | 0.98253 |
| 1 | 100 | 5.77367 | 8.18777 | 0.98253 |

The same drying procedure and compounding equipment and procedure was used for all examples included here.

Example 2

Another sample was made in a similar process of making a masterbatch (MB) first and then blending that with the film resins in which a different powder mixture chemistry was used and the effectiveness of the chemistry was evaluated. The powder mixture was composed of, 68% sodium octanoate, 7% 4-Hydroxy Benzoate, 3% Benzotriazole, and 22% Ammonium benzoate. This mixture is going to be called VC1#2 going forward. The mixture was then mixed with PBAT pellets at 70 to 30% ratio to make a master-batch.

This was compared to a mixture of 87% sodium octanoate, 9% 4-Hydroxy Benzoate, and 4% Benzotriazole, called VCI#3. Each powder mixture was then mixed with PBAT pellets at 70 part to 30 part ratio to make the master-batch. After that, the film was made by mixing the above MB at the loadings below with PLA, PBAT and filler through MB and the rest comprised of PBAT.

The contact testing in cyclic atmospheric chamber running according to (IEC 68-2-30) for both examples showed the first mixture VCI#2 to get a grade 4-5 protection compared to the VCI#3 which got grade 2 rating.

The NACE Standard TM0208 test showed grade 3 for the first formulation and grade 1 for the second set.

| Example | PBAT | PLA | Filler | VCI 2 | VCI 3 |
|---------|------|-----|--------|-------|-------|
| 2 | 83.89 | 16.11 | 6.44468 | 1.15237 | 0 |
| 2 | 83.89 | 16.11 | 6.44468 | 0 | 1.15237 |

Example 3

Similar to Example 1 and just with a different VCI chemistry, the VCI#2 was added at similar loading PBAT/filler in one case, and to LDPE/LLDPE blend in another case as the control. The PBAT/VCI film showed no corrosion (grade 5) while quite a few spot (grade 3) was observed in control, LDPE/LLDPE film with comparable VCI concentration after 1 week of testing, 7 cycles of (IEC 68-2-30).

| Example | PBAT | PLA | Filler | VCI 2 |
|---------|------|-----|--------|-------|
| 3 | 100 | 0 | 8.188 | 0.98253 |

Example 4

VCI#2, was added to PBAT/filler mix at the same loading, with the difference between the two set being the filler level, one at lower filler and one at higher filler level.

The set with higher filler level showed better protection in the cyclic chamber test running according to (IEC 68-2-30) after two weeks (14 cycles). The rating for the higher filler was 4-5 while it was 3-4 for lower filler samples. The water vapor transmission rate of the higher filler film was 412 [g/(m2 d)] versus the WVTR of the lower loading being 323 [g/(m2 d)] (normalized) tested at 38° C./90% RH.

| Example | PBAT | PLA | Filler | VCI 2 |
|---|---|---|---|---|
| 4 | 100 | 0 | 17.417 | 1.06635 |
| 4 | 100 | 0 | 8.18777 | 0.98253 |

Example 5

VCI#3 that showed weaker result in example #2, however, when used with higher filler level, showed improved result. While lower filler containing sample showed grade 2 after 14 cycles of (IEC 68-2-30) test, higher filler sample showed grade 3.

| Example | PBAT | PLA | Filler | VCI 3 |
|---|---|---|---|---|
| 5 | 100 | 0 | 17.417 | 1.06635 |
| 5 | 100 | 0 | 8.18777 | 0.98253 |

While in accordance with the patent statutes, the best mode and preferred embodiment have been set forth, the scope of the invention is not limited thereto, but rather by the scope of the attached claims.

What is claimed is:

1. A biodegradable volatile corrosion inhibitor polyester composition, comprising:
   polyester comprising one or more biodegradable random copolymer polyesters and/or one or more biodegradable homopolymer polyesters;
   volatile corrosion inhibitors comprising: (i) sodium octanoate, (ii) one or more ammonium salts, and (iii) one or more of benzoic acid, sorbic acid, and a benzoic acid derivative; and
   at least one filler.

2. The composition of claim 1, wherein the one or more biodegradable random copolymer polyesters has the formula:

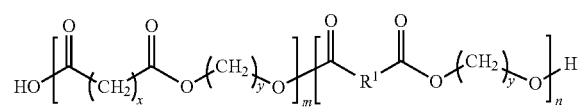

wherein $R^1$, is

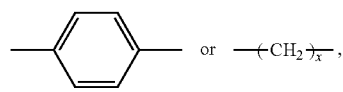 or $-(CH_2)_{\overline{x}}-$, x is an integer in the range of 2 to 10, y is an integer in the range of 2 to 8; and m and n are selected such that the weight average molecular weight of the copolymer polyester is about 80,000 to about 175,000.

3. The composition of claim 1, wherein the one or more biodegradable random copolymer polyesters is selected from polybutylene sebacate-co-terephthalate (PBST) and polybutylene adipate-co-terephthalate (PBAT).

4. The composition of claim 1, wherein the one or more biodegradable random copolymer polyesters does not contain any repeat units derived from succinic acid.

5. The composition of claim 1, wherein the one or more biodegradable homopolymer polyesters is selected from polylactides, polycaprolactones, polyglycolides, polyhydroxyalkanoates, and combinations thereof.

6. The composition of claim 5, wherein the one more biodegradable homopolymer polyesters comprises a polylactide and the at least one filler comprises talc.

7. The composition of claim 1, comprising a blend of the one or more biodegradable random copolymer polyesters and the one or more biodegradable homopolymer polyesters, wherein the total weight of the one or more biodegradable random copolymer polyesters is about 50 wt % to about 95 wt % based on the total weight of the blend, and the total amount of the one or more biodegradable homopolymer polyesters is about 5 wt % to about 50 wt % based on the total weight of the blend.

8. The composition of claim 1, wherein the weight average molecular weight of the one or more biodegradable random copolymer polyesters is about 90,000 to about 150,000, and the weight average molecular weight of the one or more homopolymer polyesters is about 125,000 to about 140,000.

9. The composition of claim 1, wherein the volatile corrosion inhibitors are present in a total amount of about 0.1 wt % to about 10 wt % based on the total weight of the polyester.

10. The composition of claim 1, wherein the volatile corrosion inhibitors comprise one or more of ammonium benzoate and sorbic acid.

11. The composition of claim 1, wherein the volatile corrosion inhibitors consist of: (i) sodium octanoate, (ii) one or more ammonium salts, and (iii) one or more of benzoic acid, sorbic acid, and a benzoic acid derivative.

12. The composition of claim 1, wherein the at least one filler comprises talc, calcium carbonate, a silicate, sodium carbonate, clay, barite, or a combination thereof.

13. The composition of claim 1, comprising about 3 to about 53 parts by weight of the at least one filler based on 100 total parts by weight of the polyester.

14. The composition of claim 1, wherein the composition exhibits a corrosion-protective effect of Grade 3 or higher according to NACE Standard TM0208.

15. A film comprising the composition of claim 1, wherein the film has a thickness of about 0.5 mils to about 8 mils.

16. A volatile corrosion inhibitor-containing concentrate, comprising:
   volatile corrosion inhibitors comprising: (i) sodium octanoate, (ii) one or more ammonium salts, and (iii) one or more of benzoic acid, sorbic acid, and a benzoic acid derivative; and
   polyester comprising one or more biodegradable random copolymer polyesters and/or one or more biodegradable homopolymer polyesters;
   wherein a ratio of volatile corrosion inhibitors to polyester in the concentrate is in the range of about 1:20 to about 10:20.

17. The composition of claim 1, wherein the one or more ammonium salts comprises ammonium benzoate.

18. The composition of claim 1, wherein the composition comprises the one or more benzoic acid derivative.

19. The composition of claim 18, wherein the benzoic acid derivative comprises 4-hydroxy benzoate.

\* \* \* \* \*